United States Patent

[11] 3,611,125

| [72] | Inventors | Meyer Press<br>Sharon;<br>Roy P. Sallen, Wayland, both of Mass. |
|---|---|---|
| [21] | Appl. No. | 830,234 |
| [22] | Filed | June 4, 1969 |
| [45] | Patented | Oct. 5, 1971 |
| [73] | Assignee | Sylvania Electric Products, Inc. |

[54] APPARATUS FOR MEASURING ELECTRICAL RESISTANCE
7 Claims, 3 Drawing Figs.

[52] U.S. Cl. ............................... 324/64
[51] Int. Cl. ........................... G01n 27/14
[50] Field of Search ....................... 324/64, 9, 1, 10

[56] References Cited
UNITED STATES PATENTS
1,893,700   1/1933   Enlund ............... 324/64

2,659,862   11/1953   Branson ............... 324/64
2,880,389   3/1959   Ferre et al. ............ 324/1
3,379,964   4/1968   Segesman .............. 324/10
2,586,868   2/1952   Scott .................. 324/64

Primary Examiner—Edward E. Kubasiewicz
Attorneys—Norman J. O'Malley, Elmer J. Nealon and David M. Keay ABSTRACT: Eight-point probe apparatus for measuring surface resistivity of a specimen including four electrodes arranged in a straight line in a manner similar to a four-point probe and four additional electrodes arranged at four points forming the corners of a rectangular pattern encircling the first four electrodes. Current is passed through the specimen between the additional electrodes, limiting the effect that edges or other discontinuities in the resistance of the specimen outside the pattern of the electrodes have on the measurements. Thus, accurate measurements of resistivity may be made closely adjacent the edges or other discontinuities in the resistance of a specimen.

INVENTORS
MEYER PRESS
ROY P. SALLEN
BY David M. Keay
AGENT

3,611,125

APPARATUS FOR MEASURING ELECTRICAL RESISTANCE

BACKGROUND OF THE INVENTION

This invention relates to apparatus for measuring electrical resistance. More particularly, it is concentrated with apparatus for measuring the surface resistivity of a specimen.

One well-known technique for measuring the electrical resistivity of a specimen is the so-called four-point probe method. Four points, or electrodes, arranged in a straight line are placed in contact with the specimen to be tested, and electrical current is passed through the specimen between the two outermost electrodes. The voltage drop between the two intermediate electrodes is measured, and employing known formulas involving the current passing through the specimen, the spacing of the electrodes, and the physical configuration of the specimen, the resistivity of the specimen can be calculated.

Apparatus of the four-point probe type have been widely used in determining the resistance of various conductive and semiconductive materials. However, edges or other discontinuities in the resistance of a specimen have an effect on the current distribution through the specimen. As a result, measurements made adjacent to edges or other discontinuities in resistance are not accurate and appropriate correction factors must be applied to these measurements in order to calculate the resistivity of the specimen. Therefore, the apparatus does not provide a direct reading of resistivity and time and effort are required to convert measurements to accurate values of resistivity.

SUMMARY OF THE INVENTION

Apparatus in accordance with the invention permits accurate direct reading measurements of the resistivity of a specimen to be made closely adjacent to edges or other discontinuities in resistance. The apparatus includes a source of excitation current connected to a pair of excitation current electrodes. These electrodes are placed in contact with the specimen to cause excitation current to flow from one electrode to the other by way of the specimen. Means are provided for limiting the region of the specimen having a significant effect on the distribution of the excitation current in the specimen. More specifically, two sources of guard current are connected to two pairs of guard current electrodes which contact the specimen in proximity to the excitation current electrodes. Guard currents flow through the specimen between the two pairs of guard current electrodes and confine the effective excitation current to the region of the specimen lying substantially within the pattern of the guard current electrodes. A pair of potential-sensing electrodes are placed in contact with the specimen within the region, and means are connected to the potential-sensing electrodes for measuring the potential between them. The potential drop measured is a direct indication of the resistivity of the specimen.

BRIEF DESCRIPTION OF THE DRAWINGS

Additional objects, features, and advantages of resistance-measuring apparatus in accordance with the invention will be apparent from the following detailed discussion together with the accompanying drawings wherein.

DESCRIPTION OF THE INVENTION

Figure 1:
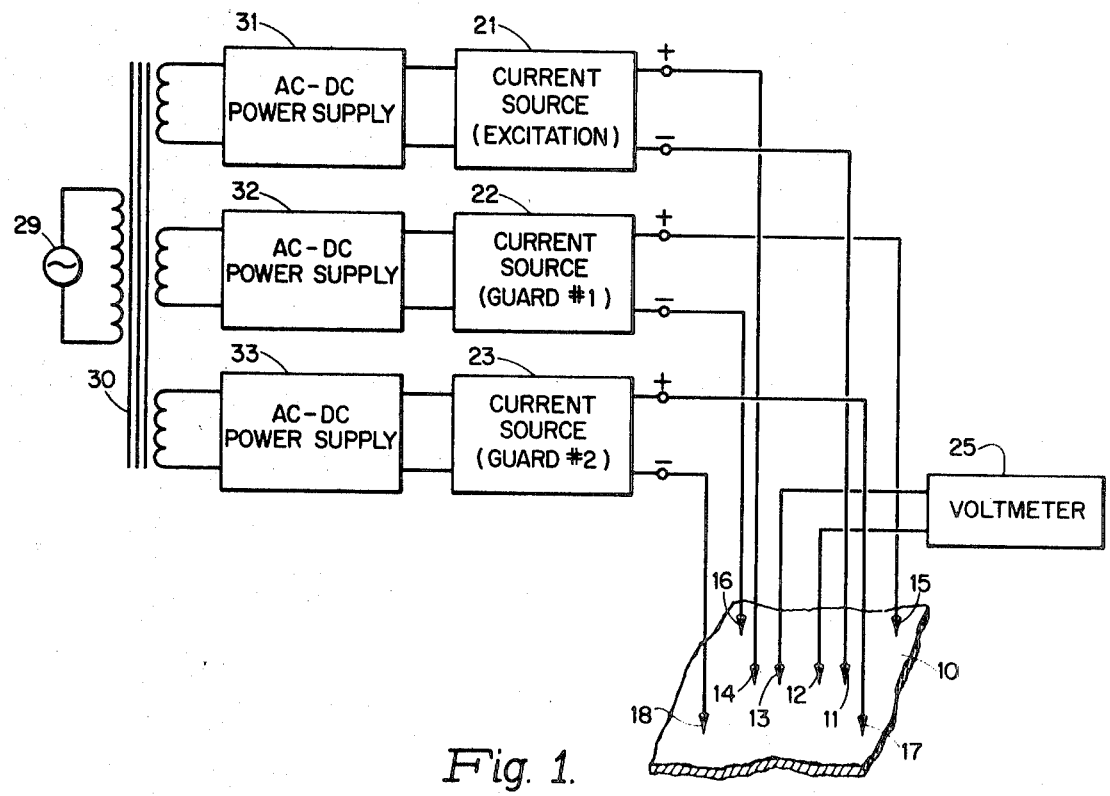
FIG. 1 is a schematic representation of apparatus according to the invention employed in measuring the resistivity of a specimen.
Figure 2:
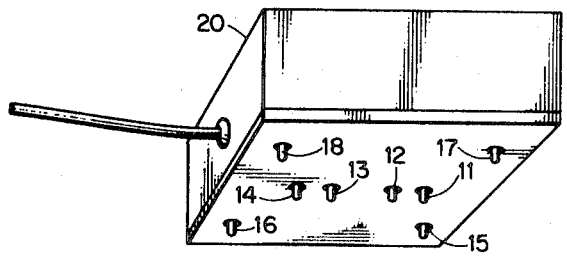
FIG. 2 is a perspective view of the measuring head employed in one embodiment of the invention illustrating the arrangement of the electrodes for contacting a specimen.

FIG. 1 is a schematic representation of apparatus in accordance with the invention for measuring the surface resistivity of a specimen 10, a portion of which is illustrated in FIG. 1. The apparatus includes eight points or electrodes 11, 12, 13, 14, 15, 16, 17, and 18 which are mounted in a measuring head 20 as illustrated in FIG. 2. The arrangement of the electrodes is illustrated in the layout diagram of FIG. 3. Four of the electrodes 11, 12, 13, and 14 are arranged in a straight line. Current is applied to the two outermost of these electrodes 11 and 14 (designated the excitation current electrodes) and the potential drop is measured across the two innermost electrodes 12 and 13 (designated the potential-sensing electrodes) in a manner similar to the well-known four-point probe technique. The four remaining electrodes 15 and 16 (designated the first pair of guard current electrodes) and 17 and 18 (designated the second pair of guard current electrodes) are disposed in a rectangular pattern encircling the excitation current electrodes 11 and 14 and the potential-sensing electrodes 12 and 13.

The excitation current electrodes 11 and 14 are connected to a first constant current source 21. The first pair of guard current electrodes 15 and 16 are connected to a second constant current source 22, and the second pair of guard current electrodes 17 and 18 are connected to a third constant current source 23. The potential-sensing electrodes 12 and 13 are connected to a voltmeter 25.

The apparatus operates generally in the following manner with the measuring head 20 positioned with the eight electrodes in contact with the surface of the specimen 10. Excitation current from the excitation current source 21 flows through the specimen 10 between the two excitation current electrodes 11 and 14. The voltage drop between the two potential-sensing electrodes 12 and 13 is measured by the voltmeter 25. In addition to the excitation current, guard currents from the guard sources 22 and 23, which are connected to the two pairs of guard current electrodes 15 and 16, and 17 and 18, respectively, also flow through the specimen 10 and confine the effective excitation current to a region of the specimen within the pattern of the guard electrodes. That is, by appropriate choice of the geometrical arrangement of the eight electrodes and the values of the excitation and guard currents, to be described in greater detail hereinbelow, the effective excitation current may be limited to a region of the specimen 10 so that edges or other discontinuities in the resistance of the specimen outside the region have substantially no effect on the measurements.

In the specific embodiment of the invention disclosed herein direct current is supplied to the electrodes although the teachings of the invention are equally applicable when alternating current is employed. As illustrated in FIG. 1, power for the constant current sources 21, 22, and 23 is supplied from an AC source 29 coupled by a transformer 30 to three AC-to-DC power supplies 31, 32, and 33 which are connected to the three constant current sources 21, 22, and 23, respectively. This arrangement provides DC isolation between the electrodes so that no fixed potential relationship is established between them except by the flow of currents through the specimen.

The AC-to-DC power supplies 31, 32, and 33 may be any well-known type of power supplies for producing regulated DC power to the constant sources 21, 22, and 23. Accurate and stable current sources 21, 22, and 23 may be provided by employing operational amplifier techniques. That is, differences between a stable reference voltage and a sample of load current through a known resistor is amplified by a high feed forward power gain amplifier and returned to the summing junction of an operational amplifier input stage as an error signal in the appropriate polarity so that the closed loop gain is essentially unity. The open circuit driving potential of the constant sources should be high compared to the full scale value of voltage to be measured (of the order of 60 to 70 volts for the particular embodiment described) so that contact resistances between the electrodes and the specimen will not cause the current sources to saturate and thus invalidate the measurements. The values of the output currents may be changed in increments, for example, in multiples of 10, by switching through a set of internal resistances in each constant current source so that the scale of the voltmeter reading can be changed to permit accurate measurements to be made over a wide range of resistivities for a variety of materials. The voltmeter 25 may be a high-impedance digital voltmeter.

In the embodiment shown, the positive output terminal of the excitation current source 21 is connected to one of the excitation current electrodes 14 and the negative output terminal is connected to the other excitation current electrode 11. The positive output terminals of the guard current sources 22 and 23 are connected to the respective guard current electrodes 15 and 17 which are nearer the excitation current electrode 11 connected to the negative output terminal of the excitation current source 21. The negative output terminals of the guard sources 22 and 23 are connected to the respective guard current electrodes 16 and 18 which are nearer the excitation current electrode 14 connected to the positive output terminal of the excitation current source 21. These connections are also indicated in the layout diagram of FIG. 3 by the arrows representing current flow into and out of the electrodes.

Figure 3:
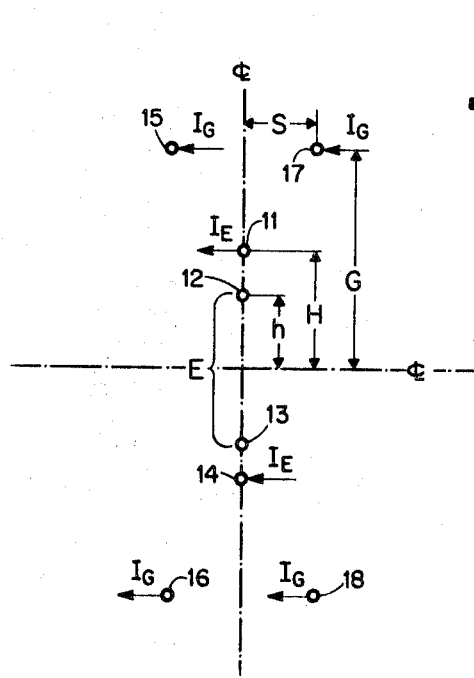
FIG. 3 is a layout diagram of the arrangement of the electrodes in the measuring head.

The relationship between the geometrical arrangement of the electrodes, the values of the excitation guard currents, the potential drop between the potential-sensing electrodes as measured by the voltmeter, and the resistivity of a specimen is given by the following expression:

$$\left[\frac{E}{I_E} \cdot \frac{4\pi}{\rho}\right] = \frac{I_G}{I_E}\left\{\ln\frac{[(G-h)^2+S^2]^4}{[(G+h)^2+S^2]^4}\right\} + \ln\frac{(H+h)^4}{(H-h)^4}$$

where
G, S, H, and h are the dimensions of the electrode arrangement as shown in the layout of FIG. 3, with the arrangement symmetrical about the two centerlines as shown in FIG. 3;

$I_G$ is the guard current provided by each source of guard current, the two guard currents provided by the two sources being equal, with current flow into and out of the guard current electrodes as indicated in FIG. 3;

$I_E$ is the excitation current, with current flow into and out of the excitation current electrodes as indicated in FIG. 3;

E is the voltage measured between the potential-sensing electrodes; and

ρ is the surface resistivity of the specimen.

By appropriate choice of the dimensions of the electrode arrangement and the ratio of the guard currents to the excitation current, the effect of conditions beyond the portion of a specimen encircled by the pattern of the guard current electrodes may be substantially eliminated. Under these conditions, the generalized expression given above holds for measurements made adjacent to discontinuities in the resistance of a specimen, such as, for example, the extremely high resistance at open edges of a specimen or the extremely low resistance at edges of a specimen which are shorted by highly conductive material, without the necessity for applying correction factors.

In one specific embodiment of the invention, the electrodes were arranged in the configuration illustrated in FIG. 3 with the following dimensions: $h=0.3$ inch, $H=0.45$ inch, $S=0.3$ inch, $G=0.9$ inch. The ratio of each guard current to the excitation current ($I_G/I_E$) was 0.295. The resulting mathematical value for the portion of the above expression to the right of the equal sign, which may be designated as the constant of proportionality of the system, therefore, was 4.99370. That is:

$$E/I_E \cdot 4\pi/\rho = 4.99370$$

or $$\rho = E(4\pi/4.99370\, I_E)$$

Values of $I_E$ were chosen so that the value of $(4\pi/4.99370\, I_E)$ in the immediately preceding expression would be a power of 10. Thus, the significant figures of measured voltage (E) were equal to the significant figures of resistivity (ρ). That is, the voltmeter provided direct readings of surface resistivity in ohms per square when multiplied by the appropriate power of 10.

The following table shows the ranges of resistivity as read directly on a digital voltmeter having a full-scale reading of 2 volts for the excitation and guard currents listed:

| Excitation Current | Guard Currents (each) | Range of Resistivity (ohms per square) |
|---|---|---|
| 25.164 milliamps | 7.424 milliamps | 0–199.9 |
| 2.5164 milliamps | 0.7424 milliamps | 0–1,999 |
| 251.64 microamps | 74.24 microamps | 0–19,990 |
| 25.164 microamps | 7.424 microamps | 0–199,900 |

With apparatus according to the disclosed embodiment it has been possible to obtain direct readings of resistivity of various conductive and semiconductive materials with an accuracy of 1 percent when the guard electrodes are placed up to an edge or corner of a specimen. Accuracy is increased to one-half percent when the guard current electrodes are placed an inch or more from the edges of a specimen.

While there has been shown and described what is considered a preferred embodiment of the invention, it will be obvious to those skilled in the art that various changes and modifications may be made therein without departing from the invention. For example, as will be noted from the general expression given hereinbelow, the dimensions of the electrodes arrangement are effective only as ratios. Therefore, a measuring head with the same relative arrangement of electrodes as illustrated in the diagram of FIG. 3 but with smaller absolute dimensions could be employed to obtain measurements of surface resistivity for relatively small specimens without the necessity for changing the current values or calibration of the apparatus. Other modifications can also be made in the apparatus of the invention as desired; for example, different values and ratios of currents, different arrangements of the electrodes, and different polarity of current source connections may be employed.

What is claimed is:

1. Apparatus for measuring the electrical resistance of a specimen comprising
   a source of excitation current;
   a pair of excitation current electrodes connected to the source of excitation current for contacting the specimen to cause excitation current to flow form one of the excitation current electrodes to the other excitation current electrodes by way of the specimen;
   means for limiting the region of the specimen having a significant effect on the distribution of excitation current in the specimen;
   a pair of potential-sensing electrodes for contacting the specimen within said region; and
   means connected to said potential-sensing electrodes for measuring the potential drop therebetween;
   said means for limiting the region of the specimen having a significant effect on the distribution of excitation current in the specimen including
   a plurality of sources of guard current; and
   a like plurality of pairs of guard current electrodes each pair of guard current electrodes being connected to a different source of guard current, for contacting the specimen in a pattern which encircles the excitation current electrodes to cause guard current to flow through the specimen between the guard current electrodes and confine the effective excitation current to a region of the specimen within said pattern.

2. Apparatus for measuring the electrical resistance of a specimen in accordance with claim 1 wherein said source of excitation current and said plurality of sources of guard current are each operable to provide a constant current.

3. Apparatus for measuring the electrical resistance of a specimen comprising a constant current source of excitation current;
a first constant current source of guard current;
a second constant current source of guard current;
a pair of excitation current electrodes connected to the constant current source of excitation current for contacting the specimen to cause excitation current to flow from one excitation current electrode to the other excitation current electrode by way of the specimen;
a first pair of guard current electrodes connected to the first constant current source of guard current for contacting the specimen to cause guard current to flow through the specimen between the first pair of guard current electrodes;
a second pair of guard current electrodes connected to the second constant source of guard current to cause guard current to flow through the specimen between the second pair of guard current electrodes;
said guard current electrodes being arranged in a pattern; which encircles the excitation current electrodes;
the arrangement of the excitation current electrodes and the guard current electrodes and the values of constant excitation and constant guard currents being selected so that the guard currents flowing through the specimen confine the effective excitation current to a region of the specimen substantially within the pattern of the guard current electrodes;
a pair of potential-sensing electrodes for contacting the specimen within said region; and
voltage-responsive means connected to said potential-sensing electrodes for measuring the potential drop therebetween to indicate the resistance of the specimen.

4. Apparatus for measuring the electrical resistance of a specimen in accordance with claim 3 wherein
said guard current electrodes are arranged in a rectangular pattern with the electrodes of the first pair located at the corners at opposite ends of one long side on the rectangular pattern, with the electrodes of the second pair located at the corners at opposite ends of the other long side of the rectangular pattern, and with said excitation current electrodes arranged centrally of the rectangular pattern along a line parallel to the long sides of the rectangular pattern; and
the pair of potential-sensing electrodes are located along said line centrally between the two excitation current electrodes.

5. Apparatus for measuring the electrical resistance of a specimen in accordance with claim 4 wherein
said constant current source of excitation current is operable to provide a constant DC excitation current between a positive output terminal and a negative output terminal;
said first constant current source of guard current is operable to provide a constant DC first guard current between a positive output terminal and a negative output terminal;
said second constant current source of guard current is operable to provide a constant DC second guard current between a positive output terminal and a negative output terminal;
said first current being substantially equal to said second guard current;
said positive terminal of said first constant current source of guard being connected to one of the guard current electrodes of the first pair of guard current electrodes, and the negative output terminal of said first constant current source of guard current being connected to the other of the guard current electrodes of the first pair of guard current electrodes;
said positive output terminal of said second constant current source of guard current being connected to the one of the guard current electrodes of the second pair of guard current electrodes nearer said one of the guard current electrodes of the first pair of guard current electrodes, and the negative output terminal of said second constant current source of guard current being connected to the other of the guard current electrodes of the second pair of guard current electrodes; and
said negative output terminal of said constant current source of excitation current being connected to the one of the excitation current electrodes of the pair of excitation current electrodes nearer said ones of the guard current electrodes of the first and second pair of guard current electrodes, and the positive output terminal of said constant current source of excitation current being connected to the other of the excitation current electrodes of the pair of excitation current electrodes.

6. Apparatus for measuring the electrical resistance of a specimen in accordance with claim 5 wherein the output terminals of the constant current source of excitation current, the output terminals of the first constant current source of guard current, and the output terminals of the second constant current source of guard current have no fixed potential relationship between them except as established by current flow through the specimen.

7. Apparatus for measuring the electrical resistance of a specimen in accordance with claim 6 wherein said voltage-responsive means is a voltmeter having a readout calibrated directly in values of ohms per square.